UNITED STATES PATENT OFFICE.

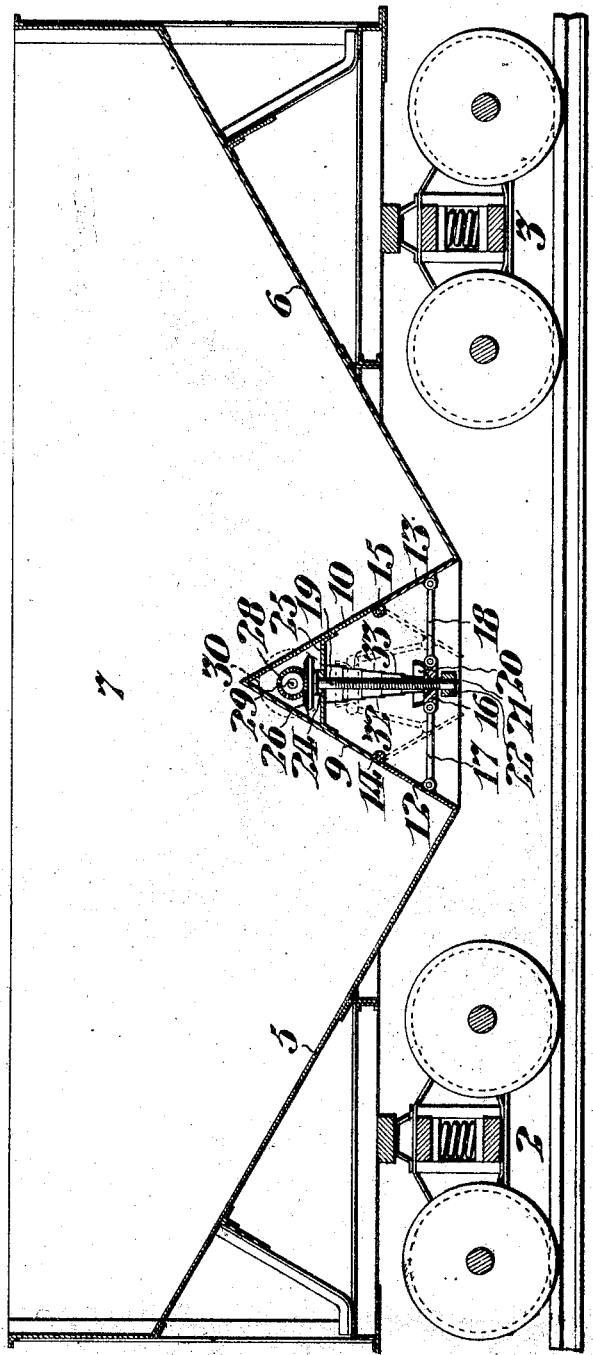

ANDERS HANSEN, OF PHILADELPHIA, PENNSYLVANIA.

RAILROAD-CAR.

970,047.

Specification of Letters Patent.  Patented Sept. 13, 1910.

Application filed April 17, 1909.  Serial No. 490,485.

*To all whom it may concern:*

Be it known that I, ANDERS HANSEN, of Philadelphia, in the State of Pennsylvania, have invented a certain new and useful Improvement in Railroad-Cars, whereof the following is a specification, reference being had to the accompanying drawing.

My invention relates to a pressed steel car, having a hopper bottom with a central angular partition whose oppositely sloping walls are provided with pivoted shutters. In the form of my invention hereinafter described, said shutters are operatively connected with a screw nut forming a crosshead, engaged with a vertical screw threaded shaft which is arranged to be rotated to raise and lower said crosshead and thus open and close said shutters. A convenient adjunctive feature of my invention is an adjustable sleeve, formed of telescopic sections surrounding said screw shaft, arranged to exclude the dust therefrom and to be collapsed and extended in accordance with the position of said crosshead.

My invention includes the various novel features of construction and arrangement hereinafter more definitely specified.

In the drawing; the frame of the car body is supported upon the trucks 2 and 3, and provided with the oppositely inclined bottom walls 5 and 6, and the side walls 7. The oppositely inclined walls 9 and 10, form a central A-shaped partition, having shutters 12 and 13, arranged to close the respective outlets between the edges of said walls 9 and 10 and the edges of said walls 5 and 6. Said shutters 12 and 13 are respectively pivoted at 14 and 15 to the walls 9 and 10, and are operatively connected with the screw nut crosshead 16, by the links 17 and 18, which are pivotally connected with said crosshead and shutters so as to swing the latter as indicated. Said crosshead 16 being in threaded engagement with the vertical screw shaft 19, the latter is arranged to be lubricated throughout its length by grease from the cup 20 carried by said nut. Said shaft is journaled in the bearing 21 in the bar 22 extending across the car, and in the bearing 24 in the strut 25. Said shaft 19 is provided with the bevel gear 26 in mesh with the bevel pinion 28, which is carried by the horizontal shaft 29, extending laterally through the side wall 7 of the car and having the exterior hand-wheel 30. Said shaft 19 is preferably protected from dust by the collapsible sleeve 32, comprising the telescopic sections 33. The upper section of said sleeve being secured to said strut 25, and the lower section being secured to said crosshead 16; rotary movement of said shaft 19 causes said sections to slide within one another as the said crosshead is raised and lowered. A similar sleeve may be provided between said crosshead and the shaft bearing 21.

I do not desire to limit myself to the precise details of construction and arrangement above described, as it is obvious that various modifications may be made therein without departing from the essential features of my invention as defined in the appended claims.

I claim:—

1. In a hopper car, the combination with a transverse double inclined central partition having outlets at the bottom thereof, leading respectively from opposite ends of the car; of shutters extending transversely with respect to the car and respectively hinged at the tops of said outlets; a vertical rotary screw shaft inclosed by said partition; a bar extending transversely with respect to the car, inclosed by said partition and having a bearing for the lower end of said screw shaft; a strut inclosed by said partition and having a bearing for the upper end of said screw shaft; a horizontal shaft extending transversely beneath said partition and projecting exterior to one side of the car; a hand-wheel upon said horizontal shaft, exterior to the car; a beveled gear-wheel on said horizontal shaft, beneath said partition; a beveled gear-wheel on the upper end of said screw shaft in mesh with the gear-wheel on said horizontal shaft; a screw nut forming a crosshead engaging said screw shaft; links pivoted to said crosshead and to said shutters; and, a dust shield for said screw shaft, comprising a series of cylindrical tubular sleeve sections arranged to slide in telescopic relation and inclosing said shaft; one of said sleeve sections being connected with said strut and the other with said crosshead.

2. In a hopper car, the combination with a transverse double inclined central partition having outlets at the bottom thereof, leading respectively from opposite ends of the car; of shutters extending transversely with respect to the car and respectively hinged at the tops of said outlets; a vertical rotary screw shaft inclosed by said partition; a bar extending transversely with respect to the car, inclosed by said partition and having a bearing for the lower end of said screw shaft; a strut inclosed by said partition and having a bearing for the upper end of said screw shaft; a horizontal shaft extending transversely beneath said partition and projecting exterior to one side of the car; a hand-wheel upon said horizontal shaft, exterior to the car; a beveled gear-wheel on said horizontal shaft, beneath said partition; a beveled gear-wheel on the upper end of said screw shaft in mesh with the gear-wheel on said horizontal shaft; a screw nut forming a crosshead engaging said screw shaft; links pivoted to said crosshead and to said shutters; and, a dust shield for said screw shaft, comprising a series of cylindrical tubular sleeve sections arranged to slide in telescopic relation and inclosing said shaft.

3. In a hopper car, the combination with a double inclined central partition having outlets at the bottom thereof; of shutters respectively hinged at said outlets; a rotary screw shaft inclosed by said partition; an operating shaft extending beneath said partition; gearing connecting said shafts; a screw nut forming a crosshead engaging said screw shaft; means operatively connecting said crosshead and said shutters; and, a dust shield for said screw shaft comprising a series of cylindrical tubular sleeve sections arranged to slide in telescopic relation and inclosing said shaft.

4. In a hopper car, the combination with a double inclined central partition having outlets at the bottom thereof; of shutters respectively hinged at said outlets; a rotary screw-shaft inclosed by said partition; bearings inclosed by said partition supporting said shaft; an operating shaft extending beneath said partition; gearing connecting said shafts; a screw nut forming a crosshead engaging said screw shaft; means operatively connecting said crosshead and said shutters; and, a dust shield for said screw shaft connected to move with said crosshead.

5. In a hopper car, having outlets, the combination with shutters for said outlets; of a rotary screw shaft operatively connected with said shutters; and, a dust shield for said screw shaft comprising a series of cylindrical tubular sleeve sections arranged to slide in telescopic relation in accordance with the movement of said shutters.

6. In a hopper car, having outlets, the combination with shutters for said outlets; of a rotary screw shaft operatively connected with said shutters; and, a dust shield for said screw shaft adjustable upon said shaft in accordance with the movement of said shutters.

7. In a hopper car, the combination with a double inclined central partition extending transversely at the bottom of the car and having outlets at the bottom thereof; of shutters respectively hinged at said outlets on axes extending transversely with respect to the car; a vertical rotary screw shaft beneath and inclosed by said partition; bearings inclosed by said partition supporting said shaft; an operating shaft extending beneath said partition transversely with respect to the car and carrying a hand-wheel at the side of the car; gearing connecting said shafts; a screw nut forming a cross head engaging said screw shaft; and, means operatively connecting said cross head and said shutters including links each directly connected at one end with said cross head and at the other end with one of said shutters.

In testimony whereof, I have hereunto signed my name at Philadelphia, Pa. this 16th day of April 1909.

ANDERS HANSEN.

Witnesses:
ARTHUR E. PAIGE,
CATHARINE C. CASSIDY.